United States Patent
Rick

(10) Patent No.: US 8,276,937 B2
(45) Date of Patent: Oct. 2, 2012

(54) SIDE AIRBAG FOR A MOTOR VEHICLE

(75) Inventor: Ulrich Rick, Roxheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 18 days.

(21) Appl. No.: 12/637,337

(22) Filed: Dec. 14, 2009

(65) Prior Publication Data

US 2010/0148477 A1    Jun. 17, 2010

(30) Foreign Application Priority Data

Dec. 15, 2008    (DE) .................. 10 2008 062 264

(51) Int. Cl.
*B60R 21/16* (2006.01)

(52) U.S. Cl. .................................... 280/730.2

(58) Field of Classification Search .............. 280/730.2, 280/743.1, 743.2, 749
See application file for complete search history.

(56) References Cited

U.S. PATENT DOCUMENTS

| | | | | |
|---|---|---|---|---|
| 6,042,141 A * | 3/2000 | Welch et al. | ................. | 280/729 |
| 6,152,481 A * | 11/2000 | Webber et al. | ............ | 280/730.2 |
| 6,168,193 B1 * | 1/2001 | Shirk et al. | ................. | 280/730.2 |
| 6,276,712 B1 * | 8/2001 | Welch et al. | ............... | 280/730.2 |
| 6,540,253 B2 | 4/2003 | Acker et al. | | |
| 6,695,341 B2 | 2/2004 | Winarto et al. | | |
| 6,729,644 B2 * | 5/2004 | Hill | ............. | 280/730.2 |
| 6,742,805 B2 * | 6/2004 | Hill | ............. | 280/730.2 |
| 6,758,492 B2 * | 7/2004 | Tesch | ......... | 280/730.2 |
| 6,824,164 B2 | 11/2004 | Pywell | | |
| 7,025,378 B2 * | 4/2006 | Wang | ........ | 280/730.2 |
| 7,549,669 B2 * | 6/2009 | Keshavaraj | .................. | 280/729 |
| 7,618,057 B2 * | 11/2009 | Pinsenschaum et al. | .. | 280/730.2 |
| 7,862,076 B2 * | 1/2011 | Zauritz et al. | ............. | 280/730.2 |
| 2005/0189743 A1 * | 9/2005 | Bakhsh et al. | ............. | 280/730.2 |

FOREIGN PATENT DOCUMENTS

| | | |
|---|---|---|
| DE | 29709389 U1 | 9/1997 |
| DE | 19824601 A1 | 12/1999 |
| DE | 20006927 U1 | 9/2000 |
| DE | 10049389 A1 | 5/2001 |
| DE | 102004019217 A1 | 11/2005 |
| WO | 2006060539 A1 | 6/2006 |

OTHER PUBLICATIONS

German Patent Office, German Search Report for German Application No. 102008062264.8, Oct. 13, 2010.

* cited by examiner

*Primary Examiner* — Paul N Dickson
*Assistant Examiner* — Robert A Coker
(74) *Attorney, Agent, or Firm* — Ingrassia Fisher & Lorenz, P.C.

(57) ABSTRACT

A side airbag is provided for a motor vehicle, in particular a passenger automobile, having an airbag and tensioner for stretching out the unfolded airbag. The tensioner has a peripheral, fillable tensioning frame.

18 Claims, 3 Drawing Sheets

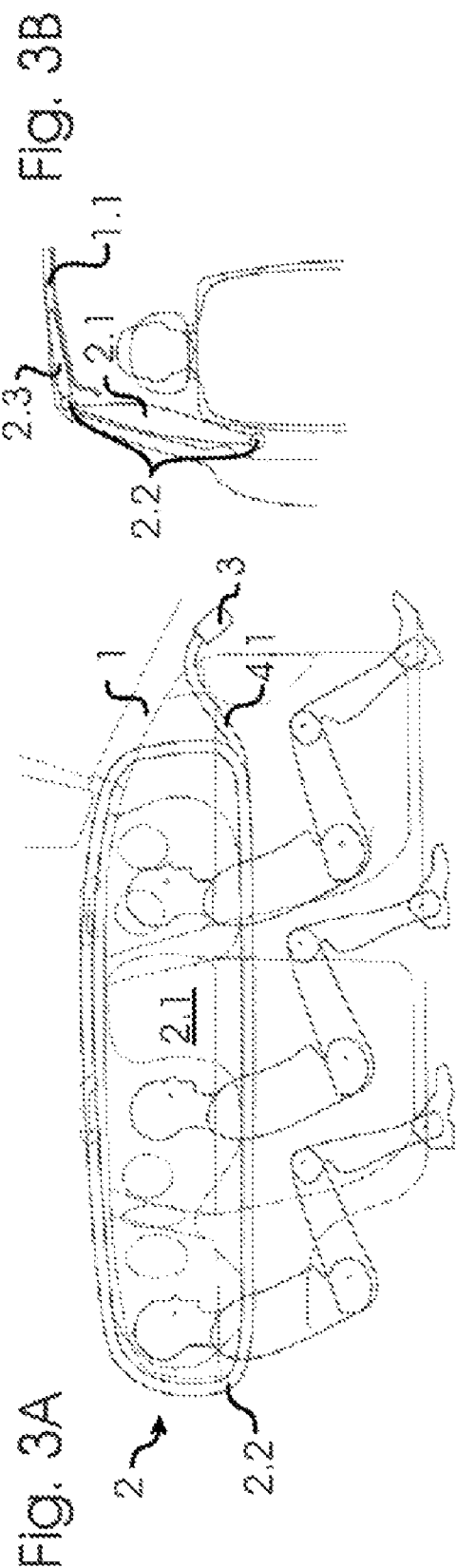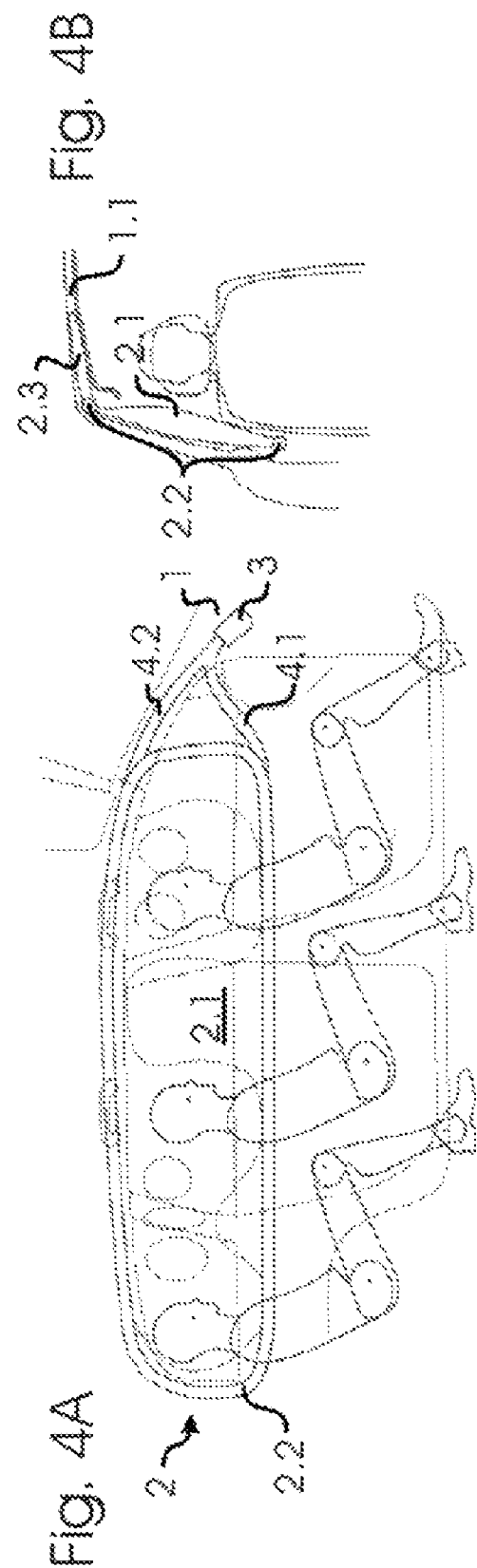

SIDE AIRBAG FOR A MOTOR VEHICLE

CROSS-REFERENCE TO RELATED APPLICATION

This application claims priority to German Patent Application No. 102008062264.8, filed Dec. 15, 2008, which is incorporated herein by reference in its entirety.

TECHNICAL FIELD

The present invention relates to a side airbag for a motor vehicle, in particular a passenger automobile, having an airbag and a tensioner for stretching out the unfolded airbag, a side airbag module, and a motor vehicle having such a side airbag.

BACKGROUND

A so-called side airbag, also referred to as a curtain airbag or window airbag, unfolds essentially on a vehicle interior in the event of an accident, in order to protect the head and thorax area of occupants in particular during a side impact or a rollover of the vehicle and to prevent the head of an occupant from projecting outward unprotected through an open side window during accident or the occupants from being thrown out of the vehicle cabin. Such airbags are typically housed folded in the area of a normally curved roof pillar, so that their installation length is greater than the linear or shortest connection between lower fastening points. Therefore, they must be stretched out in the unfolded state, in order to fulfill their safety functions described above.

For this purpose, U.S. Pat. No. 6,824,164 B2 proposes a belt tensioner and DE 1908 24 601 C2 and DE 100 49 389 B4 propose elastic tensioning bands, which have complex designs and/or are limited in their effect.

A side airbag is known from WO 2006/060539 A1 and U.S. Pat. No. 6,695,341 B2, which has a fillable hose as the tensioning means, which is connected in WO 2006/060539 A1 in a lower area and in U.S. Pat. No. 6,695,341 B2 in a middle area to an airbag of the side airbag. As a result of the radial expansion upon filling of this hose, its axial length shortens between fastening points, in order to stretch out the unfolded airbag.

The stretching force of such essentially one-dimensional tensioning means is limited, however. In addition, such known side airbags, whose airbag is typically fastened below a lateral roof frame, only offers little protection in the event of a collision of the head of the occupant with the roof-side vehicle body structure, as may occur in particular during rollovers, for which the side airbag is particularly conceived.

An airbag also usable as a side airbag is known from DE 297 09 389 U1, in which an annular chamber is implemented integrally with the airbag by seam strips, which only communicates via throttled passages with the internal volume of the airbag and is to limit its expansion in particular. Accordingly, the airbag is not stretched out through the annular chamber.

At least one object of the present invention is to improve a side airbag. In addition, other objects, desirable features, and characteristics will become apparent from the subsequent summary and detailed description, and the appended claims, taken in conjunction with the accompanying drawings and this background.

SUMMARY

A side airbag according to an embodiment of the invention for a motor vehicle, in particular a passenger automobile, comprises an airbag and a tensioner for stretching out the unfolded airbag. Preferably, airbag and/or a tensioner may be received in a folded state in a corresponding receptacle, such as a housing, a hose, or the like, which is situated on or behind an interior panel of the motor vehicle.

According to an embodiment of the invention, the tensioner has a peripheral, fillable tensioning frame. This tensioning frame is preferably implemented as essentially tubular and expands in the radial direction upon filling in a preferred embodiment, while it shortens in the axial direction because of the transverse contraction, in particular between fastening points, in which the tensioning frame can be attached to the motor vehicle, in particular the vehicle body thereof. In this way, in the filled state, the peripheral tensioning frame can stretch out the unfolded airbag.

Multiple advantages may be achieved by the peripheral implementation: on the one hand, the stretching force can be increased relative to the known one-dimensional implementations by at least two areas extending in the vehicle longitudinal direction, i.e., an upper and a lower area of the peripheral tensioning frame, and, in particular, stretching can also occur in the vehicle vertical direction, i.e., along an A, B, and/or C column, because of the frame-shaped configuration having a front and a rear area. Additionally or alternatively, an occupant can be protected from a collision with a vehicle structure, such as a lateral roof girder, by the upper longitudinal area of the peripheral tensioning frame in addition to the airbag and thus more effectively. This is advantageous in particular in the event of vehicle rollovers. Because, in addition, the tensioning frame is (also) already previously filled at the time of the beginning of the unfolding of the side airbag and this can occur more rapidly, because of its comparatively smaller volume, than the (complete) filling of the preferably larger-volume airbag, a head of the occupant can advantageously also already be protected in the event of a collision with a lateral roof area by the peripheral, filled tensioning frame when the airbag is not yet completely filled.

In order to stretch out the airbag as completely and uniformly as possible, the tensioning frame is preferably fastened to the airbag along a part or the entire outer edge thereof.

While the airbag primarily assumes a damping and retaining functionality, the tensioning frame is preferably to have a large transverse contraction, in order to display a significant contraction in the axial direction, in particular between fastening or attachment points on the motor vehicle, upon filling and the radial expansion connected thereto, and to stretch out the airbag through this shortening. In a preferred embodiment, the tensioning frame is therefore produced from a different material than the airbag, which particularly has a large transverse contraction, i.e., a shortening of an annular section in the axial direction upon radial expansion of the annular section. For this purpose, the tensioning frame can particularly have a higher elasticity than the airbag, i.e., elastically deform more strongly under the same force and/or tension.

In particular, in order to achieve this deformation characteristic, the tensioning frame can be implemented as multipart and have one or more filling hoses and a casing which encloses the filling hoses. The casing can be produced as single-layer or multilayered from woven fabric, knitted fabric, nonwoven material, and/or spun yarn, in particular from fine filaments, and preferably can be implemented as net-like. It preferably essentially absorbs the stretching out forces, while the filling hose or hoses essentially cause the radial expansion.

Additionally or alternatively, the tensioning frame can have one or more constriction links which enclose the filling hose or hoses. Such constriction links may comprise open or closed rings, tucks, and/or woven constrictions in the casing. Through suitable configuration and dimensioning of such constriction links, in particular the diameter thereof, and through suitable implementation of the casing, in particular the diameter and/or elasticity thereof, a predetermined filling characteristic of the tensioning frame and thus a desired stretching-out characteristic of the side airbag can be implemented. In particular, multiple constriction links may be provided at different distances and/or having different diameter ratios between the individual constriction links for this purpose.

In particular in order to protect a vehicle occupant from a collision with a roof-side vehicle body structure, such as a roof frame and/or a roof lining, in the filled state, an upper area of the tensioning frame is preferably situated in the area of this roof-side vehicle body structure between the structure and a passenger interior. Additionally or alternatively, in a preferred embodiment, a side airbag according to the invention can have one or more additional fillable protective chambers, which, in the filled state, are situated in a lateral roof area.

One or more gas generators are preferably provided for filling the tensioning frame and preferably also the airbag, which communicate via one or, to implement shorter filling times, two or more filling tubes with the tensioning frame, in order to fill it with the gas generated by the gas generator(s).

BRIEF DESCRIPTION OF THE DRAWINGS

The present invention will hereinafter be described in conjunction with the following drawing figures, wherein like numerals denote like elements, and:

FIG. 3A and FIG. 3B show a motor vehicle having an unfolded side airbag according to a third embodiment of the present invention in an illustration corresponding to FIG. 1A and FIG. 1B;

FIGS. 4A, 4B show a motor vehicle having an unfolded side airbag according to a fourth embodiment of the present invention in an illustration corresponding to FIGS. 1A, 1B.

DETAILED DESCRIPTION

The following detailed description is merely exemplary in nature and is not intended to limit application and uses. Furthermore, there is no intention to be bound by any theory presented in the preceding background or summary or the following detailed description.

Figure 1B:
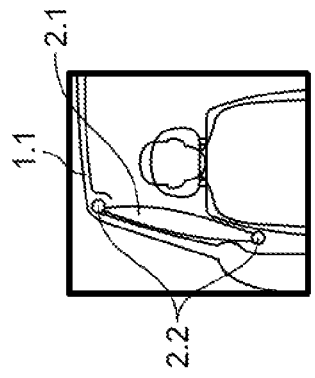
FIG. 1B shows the motor vehicle from FIG. 1A in a partial section from the front.
Figure 1A:
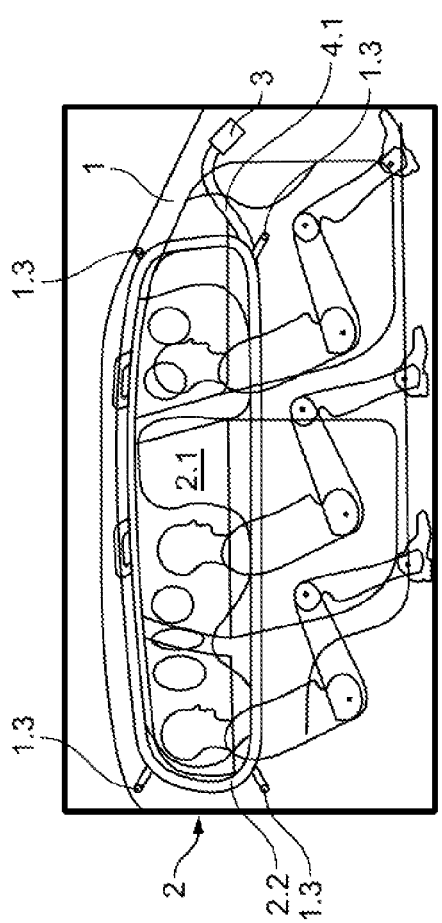
FIG. 1A shows a motor vehicle having an unfolded side airbag according to a first embodiment of the present invention in a sectional side view.

A passenger automobile 1 having six or more seats and having an unfolded side airbag 2 according to a first embodiment of the present invention is shown in FIG. 1A and FIG. 1B.

The unfolded side airbag 2 comprises an airbag 2.1, which extends essentially along an upper side area of the passenger interior, in particular over the front, middle, and rear side window openings, in order to prevent the occupants from being thrown out in the event of a vehicle rollover and to protect them from a collision with the side area of the passenger interior.

A tensioner includes 2.7 a peripheral tensioning frame 2.2 that is fastened to the airbag 2.1 along the outer edge thereof, for example, glued, sewn, and/or connected by bands thereto (not shown). The tensioning frame 2.2, as is recognizable in particular in the section of FIG. 1B, is implemented as essentially tubular, a highly elastic filling hose 2.4 being enclosed by a net-like casing 2.5, which responds to a radial expansion with a strong axial contraction. In this way, the axial length of the tubular tensioning frame 2.2 shortens, in particular its axial extension between a front and a rear lower fastening point 1.3, to which a front or rear lower corner of the airbag 2 is fastened on the motor vehicle 1, respectively.

Figure 5:
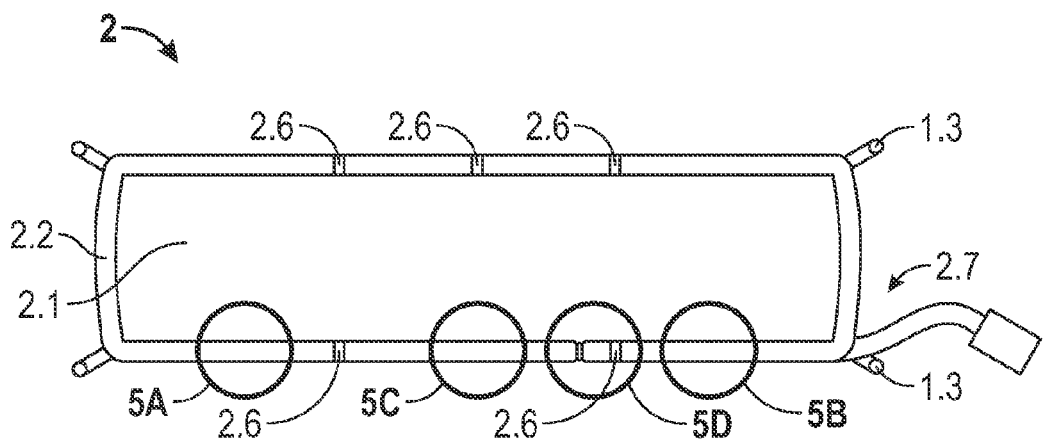
FIG. 5 shows an unfolded side airbag according to the first embodiment of the present invention including a tensioner including a tensioning frame having constriction links.
Figure 5A:
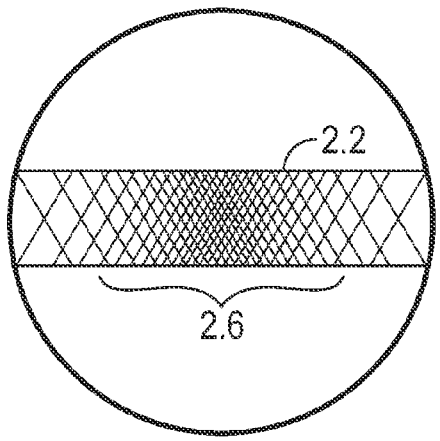
Figure 5B:
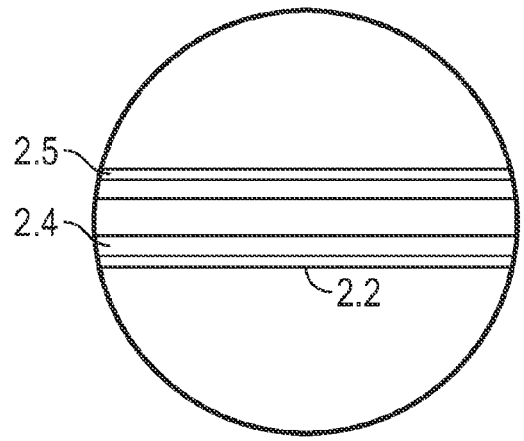
Figure 5C:
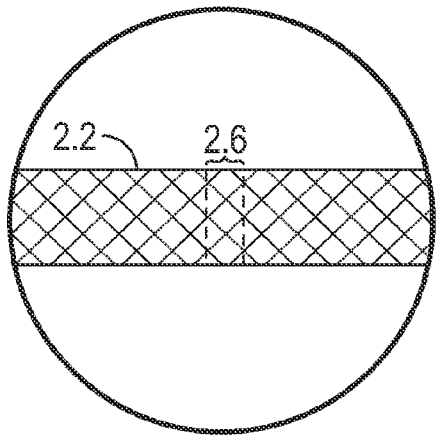
Figure 5D:
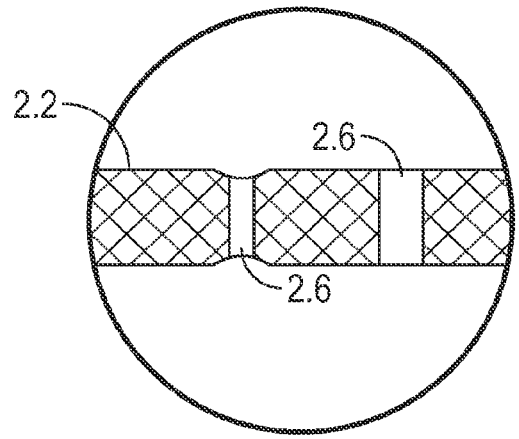

As shown in FIGS. 5, 5A, and 5C, the tensioning frame 2.2 can have one or more constriction links 2.6 which enclose the filling hose or hoses 2.4. Such constriction links 2.6 may comprise open or closed rings (as shown in FIG. 5), tucks (as shown in FIG. 5C), and/or woven constrictions (as shown in FIG. 5A) in the casing 2.5.

Upon activation of the unfolded side airbag 2, which was previously stowed folded in a receptacle behind an interior panel along a lateral roof frame the passenger automobile 1, a generator 3 in the A column of the passenger automobile 1 generates a filling gas and first conducts it via a filling tube 4.1 into the tensioning frame 2.2. This frame fills with the gas and expands into its frame-shaped form shown in FIG. 1A. It unfolds the airbag 2.1, which is simultaneously filled with filling gas via the tensioning frame 2.2 or a separate filling tube (not shown), and because of the shortening in the axial direction between the front and rear lower fastening points, it stretches out the unfolded airbag 2.1 in its filled state. In this way, occupants are particularly prevented from being thrown out to the side window openings while displacing a side airbag which is stretched out too weakly. The peripheral form of the tensioning frame 2.2 not only causes an amplified tensioning force in the vehicle longitudinal direction (left to right in FIG. 1A) because of its upper and lower area, but rather additionally stretching along the A and C columns (top to bottom in FIG. 1A and FIG. 1B).

As is recognizable in FIG. 1B in particular, an upper area of the tensioning frame 2.2 is situated in the filled state in the area of a lateral roof frame of a roof-side vehicle body structure and thus additionally protects the head of an occupant from a collision with this vehicle structure, an impact energy advantageously being dissipated directly into the vehicle structure on which the tensioning frame 2.2 is supported.

Figure 2B:
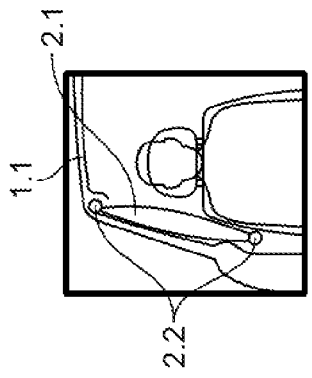
FIG. 2A and FIG. 2B show a motor vehicle having an unfolded side airbag according to a second embodiment of the present invention in an illustration corresponding to FIGS. 1A and 1B.
Figure 2A:
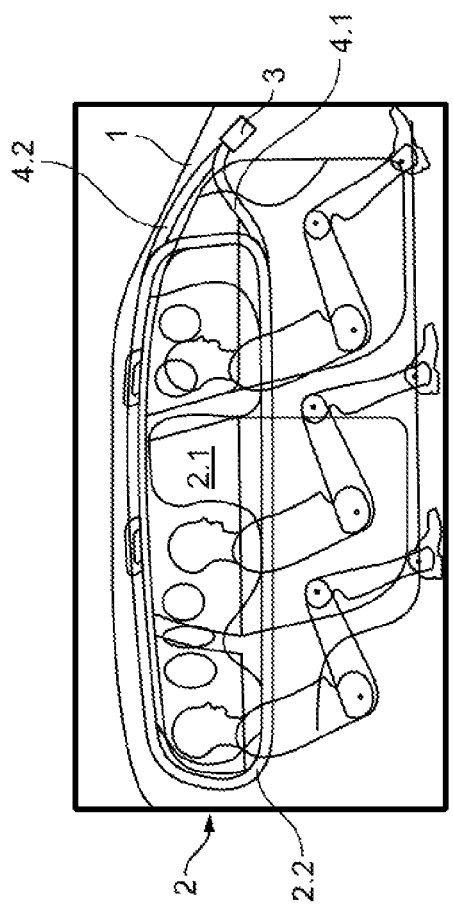

FIG. 2A and FIG. 2B show, in an illustration corresponding to FIG. 1A and FIG. 1B, a passenger automobile 1 having an unfolded side airbag 2 according to a second embodiment of the present invention. Features corresponding to the first embodiment are identified using identical reference numerals, so that the description of functionally identical features is dispensed with hereafter and only the differences between the first and second embodiments are discussed.

In the second embodiment, the gas generator 3 communicates via two separate filling tubes 4.1, 4.2 with the tensioning frame 2.2, in order to fill it and, via it, the airbag and thus shorten the filling time. In an alternative embodiment (not shown), the gas generator communicates via one or more filling tubes with the tensioning frame, and via one or more filling tubes, which are separate there from, with the airbag, in order to fill each of them. Fundamentally, it is also conceivable not to fill the airbag, but rather only stretch it out as a restraint system, which is then weakly damped by the tensioning frame.

In FIG. 3A and FIG. 3B, in an illustration corresponding to the preceding figures, a passenger automobile 1 having an unfolded side airbag 2 according to a third embodiment of the present invention is shown. Features corresponding to the first and/or second embodiments are identified using identical reference numerals, so that only the differences between the third and the prior embodiments are again discussed hereafter.

The unfolded side airbag 2 according to the third embodiment of the present invention has an additional fillable protective chamber 2.3, which is implemented integrally with the tensioning frame 2.2 on an upper area thereof or is fastened to communicate with the frame and/or the airbag 2.1, and extends in the filled state between a lateral roof area 1.1 and the passenger interior. Through this additional protective chamber 2.3, an occupant is effectively protected from a collision with the lateral roof area 1.1, in particular in the event of a vehicle rollover.

The fourth embodiment of the present invention shown in FIG. 4A and FIG. 4B represents a combination of the second and third embodiments and accordingly comprises two filling tubes 4.1, 4.2 and an additional protective chamber 2.3. The supply via multiple filling tubes 4.1, 4.2 is advantageous in particular for the sufficiently rapid filling of the additional volume of the protective chamber 2.3.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A side airbag for a motor vehicle, comprising:
    an airbag;
    a tensioner adapted to stretch-out the airbag in an unfolded configuration; and
    a peripheral and fillable tensioning frame adapted for the tensioner, wherein the tensioning frame comprises a first elasticity and the airbag has a second elasticity that is less than the first elasticity.

2. The side airbag according to claim 1, wherein the tensioning frame expands in a radial direction upon filling and shortens in an axial direction between a plurality of fastening points that are spaced apart in a vehicle longitudinal direction in order to stretch out the airbag.

3. The side airbag according to claim 1, wherein the tensioning frame is fastened to an outer edge of the airbag.

4. The side airbag according to claim 1, wherein the tensioning frame comprises a first transverse contraction and the airbag has a second transverse contraction that is less than the first transverse contraction.

5. The side airbag according to claim 1, wherein the tensioning frame is implemented with a plurality of parts and comprises a filling hose and a casing that encloses the filling hose.

6. The side airbag according to claim 5, wherein the casing is produced as at least a single-layer from a plurality of fine filaments.

7. The side airbag according to claim 5, wherein the casing is implemented as a net-like casing.

8. The side airbag according to claim 5, further comprising a constriction link that comprises a ring, a tuck, and/or a woven constriction.

9. The side airbag according to claim 8, wherein the tensioning frame comprises a plurality of multiple constriction links with a spacing ratio that differ from one another.

10. The side airbag according to claim 8, wherein the tensioning frame comprises a plurality of multiple constriction links with a diameter ratio that differ from one another.

11. The side airbag according to claim 5, further comprising a constriction link that comprises a ring.

12. The side airbag according to claim 5, further comprising a constriction link that comprises a tuck.

13. The side airbag according to claim 5, further comprising a constriction link that comprises a woven constriction.

14. The side airbag according to claim 1, wherein an upper area of the tensioning frame, in a filled state, is situated in an area of a roof-side vehicle body structure.

15. The side airbag according to claim 14, further comprising an additional fillable protective chamber that is situated in a lateral roof area in the filled state.

16. A side airbag module, comprising:
    a gas generator;
    a side airbag comprising:
    a tensioner adapted to stretch-out the side airbag in an unfolded configuration; and
    a peripheral and fillable tensioning frame adapted for the tensioner, wherein the tensioning frame comprises a first elasticity and the airbag has a second elasticity that is less than the first elasticity; and
    a filling tube adapted to fill the tensioning frame of the side airbag through the gas generator.

17. The side airbag module according to claim 16, further comprising a second filling tube adapted to fill the tensioning frame of the side airbag through the gas generator.

18. A side airbag for a motor vehicle, comprising:
    an airbag;
    a tensioner adapted to stretch-out the airbag in an unfolded configuration; and
    a peripheral and fillable tensioning frame adapted for the tensioner, wherein the tensioning frame is fastened to the airbag along an entire outer edge thereof.

* * * * *